United States Patent [19]

Ruskin et al.

[11] Patent Number: 4,595,131
[45] Date of Patent: Jun. 17, 1986

[54] BEVERAGE DISPENSING APPARATUS

[75] Inventors: Bryan E. S. Ruskin, Eardisley; Leonard K. Lewis, Kingswood, Nr. Kington, both of England

[73] Assignee: Equipment Services Ltd., England

[21] Appl. No.: 579,219

[22] Filed: Feb. 10, 1984

[30] Foreign Application Priority Data

Feb. 17, 1983 [GB] United Kingdom ............... 8304441

[51] Int. Cl.⁴ .............................................. G04C 23/00
[52] U.S. Cl. .................. 222/640; 222/129.1; 222/135; 222/146.5; 219/326
[58] Field of Search ............... 222/129.1, 129.3, 129.4, 222/132, 135, 146.1, 146.2, 146.5, 640, 641; 236/20 R; 126/351; 219/325, 326; 99/290; 137/341

[56] References Cited

U.S. PATENT DOCUMENTS

| | | | |
|---|---|---|---|
| 1,654,356 | 12/1927 | Weinberger et al. | 222/129.3 |
| 3,123,255 | 3/1964 | Martin | 222/146.5 |
| 3,809,292 | 5/1974 | Booth et al. | 222/129.1 |
| 3,855,449 | 12/1974 | Schneider | 219/326 |
| 3,927,802 | 12/1975 | Lavochkin et al. | 222/146.5 |
| 3,976,230 | 8/1976 | Sperry | 222/146.5 |
| 4,015,749 | 4/1977 | Arzberger et al. | 222/129.4 |

Primary Examiner—H. Grant Skaggs
Attorney, Agent, or Firm—Hayes, Davis & Soloway

[57] ABSTRACT

The invention relates to beverage dispensing apparatus of the kind comprising a tank, heater for heating a liquid contained therein, and container for storing concentrated beverage and dispensing it to a mixing chamber. An object of the present invention is to provide such dispensing apparatus, in which provision is made for dispensing beverages with an alternative ingredient to water, or an additional liquid ingredient, such as milk. The invention is characterized in that a pump is provided for feeding a liquid ingredient (e.g. milk or other dairy product), through the water tank for indirect heat exchange therewith, in that a temperature controlled mechanism is provided for controlling the outlet temperature of the liquid ingredient from the tank, and in that the liquid ingredient is fed in controlled, pre-determined quantities as required, to the mixing chamber. Normally, the liquid within the tank would be water and, where this water is to be used for beverage making as well as the liquid ingredient, the water tank would be provided with an outlet for feeding predetermined quantities of hot water via controlled valve system to the mixing chamber.

8 Claims, 1 Drawing Figure

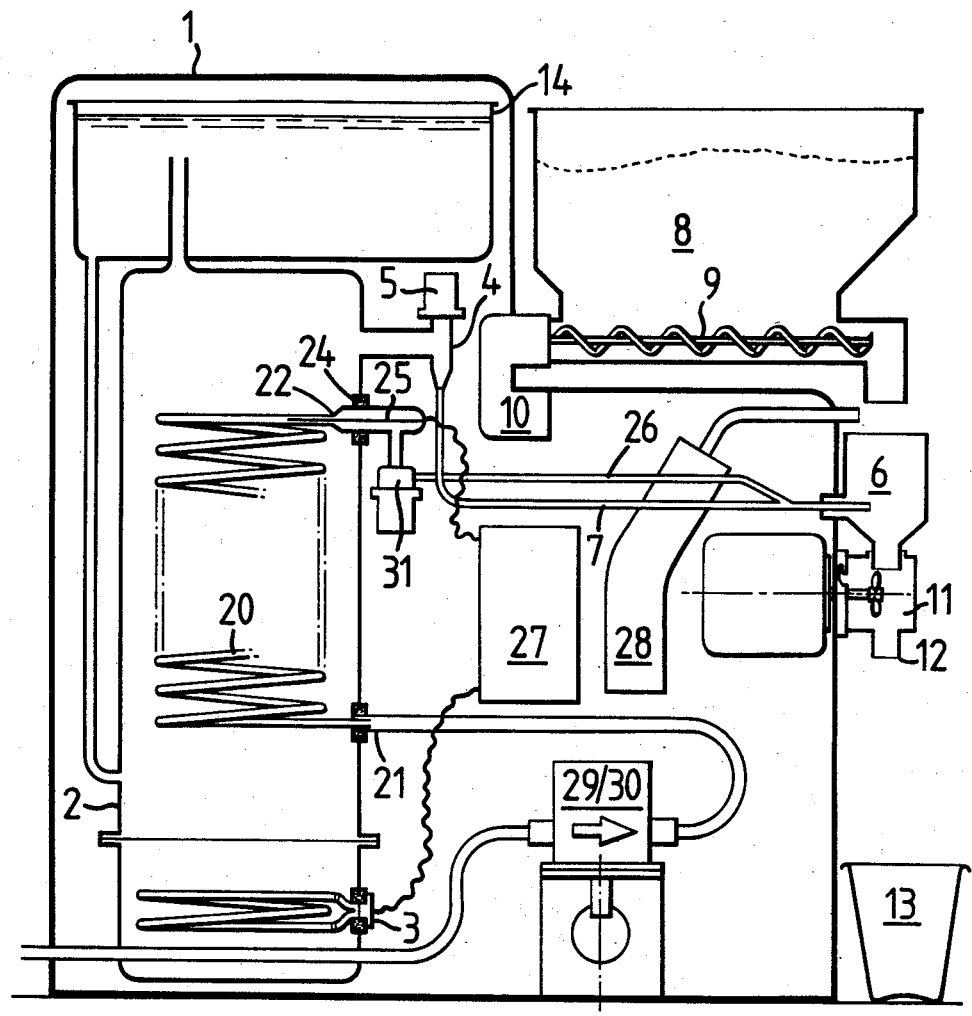

BEVERAGE DISPENSING APPARATUS

This invention relates to beverage dispensing apparatus of the kind used by caterers, factories and offices, community centers, and other organisations for the speedy and convenient dispensing of hot beverages (such as tea, coffee and chocolate), at the push of a button, or upon insertion of appropriate coinage. Such apparatus usually comprises a cabinet enclosing a water tank which is fed with cold water, either directly from a mains source, or by gravity via a reservoir. The water tank is usually provided with a thermostatically controlled immersion heater and a water outlet for the hot water, connected via a solenoid operated valve to a mixing chamber in the form of a dispensing outlet funnel. This funnel is fed with concentrated dry beverage (usually in the form of a powder, or granules) from a hopper, the hopper normally having an auger or similar feeding mechanism to feed a pre-set quantity of dry beverage out of the hopper so as to fall into the dispensing outlet funnel, where it is usually blended by a swirling action with a pre-set quantity of hot water simultaneously released by the solenoid valve from the water tank, the swirling action being created by the speed and direction by which the hot water is fed into the dispensing outlet funnel. The resulting mixed beverage then falls through a spout in the funnel into a receptacle, such as a cup or beaker, placed beneath the funnel prior to operating the apparatus. It will be appreciated that where the apparatus is designed to dispense a number of different beverages, a hopper for each beverage will be provided, together with means operable by the user to select the hopper appropriate to his preferred beverage to feed the correct dry beverage to the dispensing outlet funnel.

Also, some apparatus may be designed to dispense a whisked, or whipped beverage, such as hot chocolate, in which case it is usual to provide an additional chamber containing a motor driven whisking paddle below the spout from the dispensing outlet funnel, the mixed beverage thereby being whipped during its passage through this chamber to the waiting receptacle. Furthermore, some concentrates for whisked beverages are in the form of liquid, or syrup, in which case the usual hopper is dispensed with and replaced with a suitable pump arrangement.

All the functions of the apparatus must be timed and controlled for correct operation, usually by a series of micro-switches activated as appropriate mostly by respective adjustable cams mounted on a shaft driven by an impulse activated timer motor, or by a solid state timing circuit with provision for adjusting the various settings.

The known beverage apparatus as described in the foregoing are used independently from any other apparatus and as will be appreciated, are capable only of producing beverages using concentrated beverage products and hot water. Should another ingredient such as milk be required, it is either added to the concentrate (in the case of milk this is usually achieved by the use of spray-dried milk solids suitable for hot water reconstitution), or added subsequently in fresh form from a separate apparatus or container.

An object of the present invention is to provide beverage apparatus of the kind described above, in which provision is made for dispensing beverages with an alternative ingredient to water, or an additional liquid ingredient, such as milk.

According to this invention, beverage dispensing apparatus of the kind comprising a tank, heating means for heating a liquid contained therein, and means for storing concentrated beverage and dispensing it to a mixing chamber, is characterised in that means are provided for feeding a liquid ingredient (e.g. milk or other dairy product), through the water tank for indirect heat exchange therewith, in that means are provided for controlling the outlet temperature of the liquid ingredient from the tank, and in that the liquid ingredient is fed in controlled, pre-determined quantities as required, to said mixing chamber.

Normally, the liquid within the tank would be water and where this water is to be used for beverage making as well as an additional liquid ingredient, the tank would be provided with an outlet for feeding predetermined quantities of hot water via controlled valve means to the mixing chamber Preferably, a tubular helical coil, or the like, of glass, stainless steel, or other non-toxic material suitable for withstanding the constant elevated temperature of the water tank is mounted within the latter, and the liquid ingredient is fed via pump means through the heating coil.

In the case where the liquid ingredient is milk, it is important that the temperature is kept below approximately 80° C. to prevent rapid separation of the protein and calcium in the milk, which would cause deposits to build up in the coil and also affect the taste of the milk beverage. Furthermore, it is important that the milk be heated to a temperature above 70° C. andheld at this temperature for about 15 seconds for sterilisation, and of course to ensure that the dispensed beverage is at an acceptably high temperature. To ensure that the milk is within this temperature range for at least the time required to achieve sterilisation, the flow rate of the pump means, and the length and internal dimension of the coil, in relation to the normal hot water temperature in the water tank are carefully chosen. However, to ensure that the milk is kept within its parameters, whether it is standing within the coil for considerably periods when there is no user demand, or it is being regularly drawn-off as a result of continual user demand, a temperature probe may be inserted in the outlet from the coil to monitor continuously the temperature of the milk, and to control the temperature of the hot water by appropriate switching in or out of the water heating means.

In order that the invention may be readily understood, and further features made apparent, one exemplary embodiment in accordance therewith will now be described, with reference to the single Figure of the accompanying drawing, which is a somewhat diagrammatic elevation of the beverage dispensing apparatus.

Referring to the Figure, the apparatus is for use in dispensing both water and milk beverages and mixtures thereof and is generally of the type described above comprising a cabinet 1 housing a water tank 2 which is fed by gravity from a water supply in a header tank 14. Hot water, heated to a controlled temperature in the tank by a thermostatically controlled immersion heater 3, is fed on demand via an outlet from the tank and a duct 7 through a valve 4, the opening of the valve being controlled for timed periods by a solenoid 5, to provide predetermined quantities of water to a mixing chamber, in the form of a dispensing outlet 6. This apparatus is intended to use concentrated dry product, which is stored in a hopper 8 and fed via a rotatable auger 9, driven for timed periods by a motor 10, to feed predetermined quantities to fall by gravity into the dispensing outlet 6 and thence into a whipping chamber 11. After whipping the beverage is dispensed via an outlet spout 12 into a waiting receptacle 13.

In accordance with the present invention, a heating coil 20, preferably of heat withstanding glass, is located within the water tank 2, the inlet and outlet ends 21, 22 respectively being supported through the wall of the tank via sealed rubber grommets 24, or similar. A glass bead thermistor probe which is preferably encased and sealed within a fine glass tube 25, is inserted through the coil outlet 22 so that the probe lies in that part of the outlet end of the coil which is within the water tank 2. In this way the outlet temperature of the coil is monitored very accurately, particularly if zinc oxide, or similar material, is compacted around the thermistor within the fine glass tube, since this material has a good thermal conductivity and, thereby, the probe is rendered more sensitive. The probe is arranged to feed signals to an electronic control circuit 27 which is arranged to switch in or switch out the immersion heater 3 (or possibly an additional heater) to control the water temperature, and hence the temperature of the liquid being fed through the coil 20 and into the dispensing outlet 6, via a feed line 26. It will be appreciated that measured quantities of the liquid feed via the feed line 26 depends upon the pump flowrate and the coil length and dimensions, which determine the volume of the liquid feed per unit of time a valve 31 controls the flow of milk to the feed line 26. As referred to above the liquid ingredient is milk, and hence the controlled temperature band would be set between approximately 70° C.–80° C. for the reasons discussed above. To achieve a suitable temperature band, experiments have been conducted to obtain design parameters such that the milk within the coil does not exceed the maximum temperature if it remains in the heating coil for a prolonged period due to lack of demand, and also that the milk reaches the minimum temperature, and is held there for the requisite time (15 secs or more) even when there is a considerable regular demand, say with only a 10 second pause between operations. From this, with a water tank temperature held generally approximate at but not above 80° C., and using an immersion heater of 2½/3 kw, a 6 mm (internal diameter) coil with 0.1 mm wall thickness and helically coiled to a diameter of approximately 90.0 mm and with a tube length of approximately 4.6 m, it has been found that a 6½-7 fluid oz measure of milk can be dispensed within the minimum 15 second time cycle, as determined by the above mentioned requirement, to guarantee sterility of the milk.

The milk is fed through the coil by a diapragm pump 29 those working parts of which comes into direct contact of the milk, being of approved food quality materials. The pump 29 is chosen to provide variable flow rates, whereby the flow of milk can be finely adjusted to meet the flow requirements discussed above.

It will be appreciated that all of the functions to be carried out by the apparatus need to be controlled in carefully timed relationships, and for this purpose a suitably designed electronic controller 30 is provided and appropriately connected between the pump and the electronic control circuit 27. It will be appreciated here that the circuit 27 and the control circuit for the electronic controller 30 can be incorporated into a single solid state printed circuit board. Such a controller, via a manually operated selector, can be made to adjust the flow of liquid from hot water only, through combinations of both, to milk only, to the dispensing outlet 6 and whipping chamber 11 so as, for example, to produce coffee black, or at a required degree of "White".

The milk fed by the diapragm pump 29 is conveniently obtained from a refrigerated source, which may be associated with the apparatus. Preferably, however, the source is a separate refrigerated unit e.g. such as that marketed as a "Milkpak System", in which case a feed additional to the normal dispensing outlet would be tapped from the unit, so that it could still operate to dispense fresh milk directly to a user.

It will be appreciated that the dispensing apparatus can be designed to dispense all milk products only, in which case the hot water in water tank 2 is used only as a heating source for the milk. Therefore, an outlet 4 would not be required for water to be fed to the dispensing outlet 6, thus simplifying the timed controlled operations.

We claim:

1. Beverage dispensing apparatus of the kind comprising a water tank, heating means for heating water contained therein, means for storing concentrated beverage product, and means for dispensing said product in controlled, predetermined quantities, characterized by pump means for supplying a liquid ingredient for the beverage from a storage, duct means extending through said water tank to a duct outlet and connected at a duct inlet to said pump means for feeding said liquid ingredient through the water tank for indirect heat exchange therewith, temperature sensor means located adjacent the duct outlet from said water tank, temperature control means responsive to said sensor means for controlling said heating means of the water tank to adjust the water temperature and hence the outlet temperature of said liquid ingredient at the duct outlet, valve means connected to the duct outlet, and timing control means associated with said pump means for initiating flow of said liquid ingredient through said duct means and dispensing same in controlled, pre-determined quantities into a mixing chamber.

2. Beverage dispensing apparatus according to claim 1, characterized in that said duct means comprises a tubular coil of non-toxic material, the length, diameter and wall thickness of the coil, in relation to a pie-set hot water temperature of said water tank and the flow rate of said pump means, being selected to achieve a required outlet temperature which temperature is constantly monitored by said sensor means and adjusted as necessary by said temperature control means.

3. Beverage dispensing apparatus according to claim 2 and in which the liquid ingredient is refrigerated milk, characterised in that said control means is set to temperature control the temperature of the milk within the range 70°–80° C. and to maintain the milk at this temperature for at least approximately 15 seconds prior to despensing.

4. Beverage dispensing apparatus according to claim 3, characterized in that said sensor means includes a semi-conductor enclosed and sealed within a glass tube, which in turn is sealed within the outlet end of said coil.

5. Beverage dispensing apparatus according to claim 4, characterised in that a high thermal conductivity material such as zinc oxide is compacted around said semi-conductor to render it more sensitive to temperature changes.

6. Beverage dispensing apparatus according to claim 3, characterised in that the apparatus is arranged to dispense a 6½ to 7 fluid oz measure of milk, in that said heating means for the tank is a 2½ to 3 kw immersion heater, and in that the heating coil is made of glass of 6 mm internal diameter with 0.1 mm wall thickness and a tube length of approximately 4.6 m.

7. Beverage dispensing apparatus according to claim 1 arranged to dispense beverages of beverage product, water, said liquid ingredient and combinations thereof according to user demand, characterized in that said water tank has a water outlet with a supply duct which extends to said mixing chamber, in that for feeding water in predetermined quantities to said mixing chamber, and in that a header tank is arranged to provide make-up water drawn from said tank.

8. A beverage dispensing apparatus according to claim 1, wherein said pumping means pumps for a predetermined timed period, said timed period being dependent upon physical characteristics and dimensions of said duct means and controlled by said timing control means.

* * * * *

UNITED STATES PATENT AND TRADEMARK OFFICE
CERTIFICATE OF CORRECTION

PATENT NO. : 4,595,131
DATED : June 17, 1986
INVENTOR(S) : Bryan Ernest Sidney RUSKIN and Leonard Kenneth LEWIS It is certified that error appears in the above—identified patent and that said Letters Patent is hereby corrected as shown below:

Claim 2, line 47, column 4, the word "pie" should be "pre".

Signed and Sealed this

Thirtieth Day of September 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,595,131

DATED : June 17, 1986

INVENTOR(S) : Bryan E. S. Ruskin and Leonard K. Lewis

It is certified that error appears in the above-identified patent and that said Letters Patent is hereby corrected as shown below:

Column 4, lines 55 and 56 delete "temperature" first occurrence.

Column 4, line 55, insert "temperature" after "said".

Signed and Sealed this

Second Day of December, 1986

*Attest:*

DONALD J. QUIGG

*Attesting Officer*

*Commissioner of Patents and Trademarks*